United States Patent
Foth et al.

(10) Patent No.: US 8,612,346 B2
(45) Date of Patent: Dec. 17, 2013

(54) METHOD AND SYSTEM FOR CLOSED LOOP COLLECT ON DELIVERY (C.O.D.) PAYMENTS

(75) Inventors: Thomas J. Foth, Trumbull, CT (US); Steven Adams, Briarcliff Manor, NY (US)

(73) Assignee: Pitney Bowes Inc., Stamford, CT (US)

( * ) Notice: Subject to any disclaimer, the term of this patent is extended or adjusted under 35 U.S.C. 154(b) by 3975 days.

(21) Appl. No.: 10/256,737

(22) Filed: Sep. 26, 2002

(65) Prior Publication Data

US 2003/0212631 A1    Nov. 13, 2003

Related U.S. Application Data

(60) Provisional application No. 60/379,372, filed on May 10, 2002.

(51) Int. Cl.
*G06Q 40/00* (2012.01)

(52) U.S. Cl.
USPC ............. 705/40; 380/252; 380/255; 380/282; 705/39; 705/44; 705/64; 705/71; 902/2

(58) Field of Classification Search
None
See application file for complete search history.

(56) References Cited

U.S. PATENT DOCUMENTS

| | | | |
|---|---|---|---|
| 5,222,018 A | 6/1993 | Sharpe et al. | |
| 5,283,829 A | 2/1994 | Anderson | |
| 5,883,810 A * | 3/1999 | Franklin et al. | ............... 700/232 |
| 5,910,896 A | 6/1999 | Hahn-Carlson | |
| 6,052,675 A | 4/2000 | Checchio | |
| 6,175,825 B1 | 1/2001 | Fruechtel | |
| 6,405,182 B1 | 6/2002 | Cuervo | |
| 6,571,149 B1 | 5/2003 | Hahn-Carlson | |

(Continued)

FOREIGN PATENT DOCUMENTS

| | | |
|---|---|---|
| WO | WO 00/52555 | 9/2000 |
| WO | WO 00/75843 | 12/2000 |
| WO | WO 01/48708 | 7/2001 |

OTHER PUBLICATIONS

Lynch, C. A. (1994). The integrity of digital information: Mechanics and definitional issues. Journal of the American Society for Information Science (1986-1998), 45(10), 737. Retrieved from http://search.proquest.com/docview/216898639?accountid=14753.*

Madsen, M., & Yoslow, R. (1999). Spotlight on the custOmer. Intelligent Enterprise, 2(4), 26-34. Retrieved from http://search.proquest.com/docview/200662899?accountid=14753.*

(Continued)

*Primary Examiner* — Muriel Tinkler

(74) *Attorney, Agent, or Firm* — Brian A. Lemm; Charles R. Malandra, Jr.; Steven J. Shapiro

(57) ABSTRACT

A trusted closed loop payment system and method that reduces the liability imposed upon carriers for delivery of C.O.D. shipments is provided. A third party payment system is authorized by the buyer to make payments to a shipper (and, if applicable, a freight forwarder) on behalf of the buyer upon receipt of goods by the buyer. Since the payment for the shipment is being made by the third party payment system, and guaranteed by the third party payment system, the liability imposed on the carrier to ensure the payment is proper and will be honored is removed. In addition, the present invention provides several advantages for shippers and buyers as well, including receipt of payment by a shipper in a much shorter time frame, and multiple payment options for buyers for account reconciliation with the third party payment system for the C.O.D. shipments.

4 Claims, 3 Drawing Sheets

(56) References Cited

U.S. PATENT DOCUMENTS

| | | | |
|---|---|---|---|
| 6,643,625 B1* | 11/2003 | Acosta et al. | 705/38 |
| 2002/0073043 A1* | 6/2002 | Herman et al. | 705/64 |
| 2003/0080183 A1 | 5/2003 | Rajasekaran et al. | |
| 2006/0074793 A1* | 4/2006 | Hibbert et al. | 705/38 |
| 2006/0178994 A1* | 8/2006 | Stolfo et al. | 705/50 |

OTHER PUBLICATIONS

Jean-Henry Morin, & Konstantas, D. (2000). Commercialization of electronic information. Journal of End User Computing, 12(2), 20-32. Retrieved from http://search.proquest.com/docview/199903047?accountid=14753.*

* cited by examiner

METHOD AND SYSTEM FOR CLOSED LOOP COLLECT ON DELIVERY (C.O.D.) PAYMENTS

CROSS-REFERENCE TO RELATED APPLICATIONS

This application claims priority from U.S. Provisional Application Ser. No. 60/379,372, filed on May 10, 2002, the specification of which is hereby incorporated by reference.

FIELD OF THE INVENTION

The invention disclosed herein relates generally to the field of payment systems, and more particularly to a system and method for closed loop collect on delivery (C.O.D.) payments.

BACKGROUND OF THE INVENTION

A buyer of goods purchased from a shipper currently has several options to pay for the goods, including for example, by cash, credit card, check, etc. In addition, the timing of the payment must also be agreed upon between the buyer and shipper, such as, for example, at the point of sale, within a predetermined billing cycle, etc. Included in these options is payment for the goods when they are received, commonly referred to as collect on delivery (or cash on delivery) and abbreviated C.O.D. Specifically, in a C.O.D. transaction, the buyer and shipper agree that the buyer will pay for the purchased goods, in full, immediately upon receipt by the buyer.

FIG. 1 illustrates in block diagram form an example of a conventional basic C.O.D. transaction process between a consignor/seller/shipper 12 (hereinafter referred to as shipper 12) and a consignee/buyer 14 (hereinafter referred to as buyer 14). While the example illustrated in FIG. 1 illustrates an international shipment, it should be understood that C.O.D. shipments may be both international or national. The buyer 14 places an order for goods with the shipper 12 in step (1), and in step (2) the terms of the sale are agreed to by the buyer 14. Under the C.O.D. payment option, the buyer 14 agrees to make payment simultaneously with the receipt of the shipment. The destination inland carrier 16 will be instructed to collect payment from the buyer 14 at the time of delivery. The payment instrument and currency are typically designated under the C.O.D. terms. Payment includes the charges for the goods, i.e., the purchase price, which can also include the transportation charges for shipment of the goods. Alternatively, the transportation charges can be billed separately from the purchase price, in which case the buyer 14 will be presented with more than one invoice.

Typically, the party paying for the transportation charges selects a freight forwarder 18 to orchestrate the shipping process. In this example, the transportation charges will be paid by the buyer 14 and billed separately from the purchase price of the goods. Accordingly, once the buyer 14 has informed the shipper 12 of the desired freight forwarder 18, in step (3) the shipper 12 contacts the freight forwarder 18 to arrange for the shipment of the goods to the buyer 14. In step (4) the freight forwarder 18 coordinates shipment and payment for shipment with various participants, typically one or more carriers. The participants include, for example, an origination inland carrier 20, a long haul carrier 22, such as, for example, an air cargo carrier for international shipments, and the destination inland carrier 16. It should be understood that there may be other participants as well, such as, for example, a consolidator, terminal handlers and a de-consolidator. Thus, the freight forwarder 18 will schedule with the origination inland carrier 20 the physical pick-up of the shipment and associated documentation (bill of lading, commercial invoice, etc.) from the shipper 12, delivery to long haul carrier 22, and subsequent delivery to the destination inland carrier 16. Of course, the shipment could also be palletized for consolidation (by a consolidator) with other shipments before being delivered to the origination inland carrier 20 or long haul carrier 22. In step (5), which of course may be concurrent with step (4), the shipment moves through the transportation chain system.

Upon arrival of the shipment and customs clearance in the destination country (for international shipments), the shipment is made available for pick-up by the destination inland carrier 16 for delivery to the buyer 14. Of course, if the shipment was palletized, it must first be broken down into the individual shipments for final delivery (by a de-consolidator). In step (6), the destination inland carrier 16 physically delivers the shipment to the buyer 14, along with the shipper's 12 C.O.D. purchase invoice, and, since transportation expenses are being paid by the buyer 14 in this example and billed separately from the purchase price, the C.O.D. transportation invoice(s). Typically, the buyer 14 will present separate payment instruments to the destination carrier for payment of each of the invoices in step (7). If the payment instruments are checks, the check(s) to cover transportation expenses is/are made payable to the freight forwarder 18, while the check to cover the purchase invoice is made payable to the shipper 12. The destination inland carrier 16 must perform the necessary due diligence to ensure that the payment instruments as presented conform to the C.O.D. terms.

In step (8), the destination carrier 16 provides the freight forwarder 18 with the check(s) associated with the C.O.D. transportation invoice(s), and the freight forwarder 18 will settle with the appropriate parties as applicable, i.e., the origination inland carrier 20, long haul carrier 22 and/or destination inland carrier 16. It should be noted, of course, that the freight forwarder 18, origination inland carrier 20, long haul carrier 22 and destination inland carrier 16 may not be separate entities, but instead all of them or any combination could be the same entity. Additionally, it should be noted that while the example illustrated in FIG. 1 utilizes a long haul carrier 22, shipments can also be made utilizing only a single inland carrier. In many situations, especially for domestic shipments, the origination inland carrier 20, freight forwarder 18 and destination inland carrier 16 will be the same entity. In step (9), which may be concurrent with or even before step (8), the destination inland carrier 16 provides the shipper 12 with the check(s) associated with the C.O.D. purchase invoice(s), thus completing the C.O.D. transaction.

There are problems, however, with the conventional system for paying for goods C.O.D. For example, there is a large amount of liability imposed on the carriers under the current system, and especially on the destination inland carrier 16. When the destination inland carrier 16 accepts the responsibility of delivering the shipment to the buyer 14 under the terms of C.O.D. (step (6) of FIG. 1), the destination inland carrier 16 is also responsible for collection of payment from the buyer 14 to the shipper 12, and may also be responsible for collection of payment from the buyer 14 for transportation charges if the transportation charges are being paid by the buyer 14. Thus, as noted above, it is the responsibility of the destination inland carrier 16 to ensure that payment by the buyer 14 is proper. For example, the destination inland carrier 16 must ensure that any checks presented for payment conform to the C.O.D. terms and will be honored when presented to the financial institution upon which they are drawn. If the payment tendered by the buyer 14 is not acceptable or not honored for any reason, the destination inland carrier 16 is liable to the shipper 12 for the cost of the goods. In addition, during the time each of the carriers has physical possession of the goods, they are liable for any damage to the goods, thereby further increasing the amount of liability imposed upon the carriers. Thus, many carriers are hesitant to provide service for C.O.D. shipments because of the liability imposed upon them, thereby limiting commerce between shippers and buyers.

Thus, there exists a need for a trusted payment system and method that reduces the liability imposed upon carriers for delivery of C.O.D. shipments by providing assurance of payment upon receipt of the goods.

SUMMARY OF THE INVENTION

The present invention alleviates the problems associated with the prior art and provides a trusted payment system and method that reduces the liability imposed upon carriers for delivery of C.O.D. shipments.

In accordance with the present invention, a third party payment system is authorized by the buyer to make payments to a shipper (and, if applicable, a freight forwarder) on behalf of the buyer upon receipt of goods by the buyer. The buyer establishes an account with the third party payment system and authorizes the third party payment system to make payments on their behalf. The account could be set up, for example, as an interest bearing or non-interest bearing deposit account for the buyer from which funds may be used to pay shippers and carriers for the purchase of goods delivered C.O.D. Additionally, the third party payment system could establish a credit line for the buyer. When the buyer is going to receive goods C.O.D., the buyer and/or seller can indicate that payment will occur through the third party payment system. The buyer then makes a request for payment to the third party payment system. The request may include information related to the purchase of the goods, such as, for example, a manifest of the specific items with descriptions, or the request may be as simple as an internal order number generated by the buyer or shipper. The buyer authorizes the third party payment system to provide the shipper with payment for the goods on the buyer's behalf upon receipt of the goods by the buyer. The third party payment system processes the information related to the shipment of the goods and generates a payment authorization number (PAN), which is provided to the buyer. The PAN may be cryptographically generated over a sufficiently wide range of integer values such that it would be difficult for an unauthorized party to guess the number assigned to a shipment with the attributes previously specified.

A carrier (or plurality of carriers in succession) will then move the goods from the shipper to the buyer. When a carrier arrives at the buyer's location to deliver the shipment, the carrier requests the PAN from the buyer. The carrier then communicates with the third party payment system and provides the PAN, received from the buyer, to the third party payment system. The third party payment system will then confirm validity of the PAN to the carrier. Optionally, along with a validation of the PAN, the third party payment system may provide the carrier with additional verification information related to the shipment, such as, for example, a description of the goods being delivered, the name and address of the buyer and/or shipper, the actual location delivery is to take place, and the origination address of the shipment.

If the PAN is validated, the carrier will deliver the shipment of goods to the buyer and provide confirmation to the third party payment system that delivery has occurred. The third party payment system will then provide payment to the shipper and carrier(s), if applicable, on the buyer's behalf.

Since the payment for the shipment is being made by the third party payment system, and guaranteed by the third party payment system, the liability imposed on the carrier to ensure the payment is proper and will be honored is removed. Thus, the third party payment system of the present invention provides a closed loop payment system comprising the shipper, buyer and the third party payment system.

The present invention also provides several advantages for shippers and buyers as well. For shippers, use of the third party payment system can result in payments being received on behalf of buyers in a much shorter time frame, thereby reducing the overall costs of the shippers. With respect to the buyers, since the payment is provided by the third party payment system directly to the shipper for C.O.D. shipments from the buyer's account, the buyer now has multiple payment options for account reconciliation with the third party payment system for the C.O.D. shipments. For example, a buyer can now effectively pay for shipments received C.O.D. utilizing "Just-In-Time" payments, "Pay In Advance" payments, and/or "Pay In Arrears" payments. The "Just-In-Time" payment option allows the buyer to pay the third party payment system at the time of receipt of the goods. The "Pay In Arrears" payment option provides the buyer with a credit line, established by the third party payment system, to pay for goods received C.O.D. The "Pay In Advance" payment option may provide buyers with interest on prepaid C.O.D. deliveries.

All of the payment solutions of the present invention allow the buyer to view all of the details of the buyer's accounts with the third party payment system on-line, including historical payment information, initiate on-line payments, and initiate and approve on-line authorizations. Buyers can make payments to the third party payment system in a number of ways, including, for example, via check, ACH credit or debit, credit or debit card, or wire.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
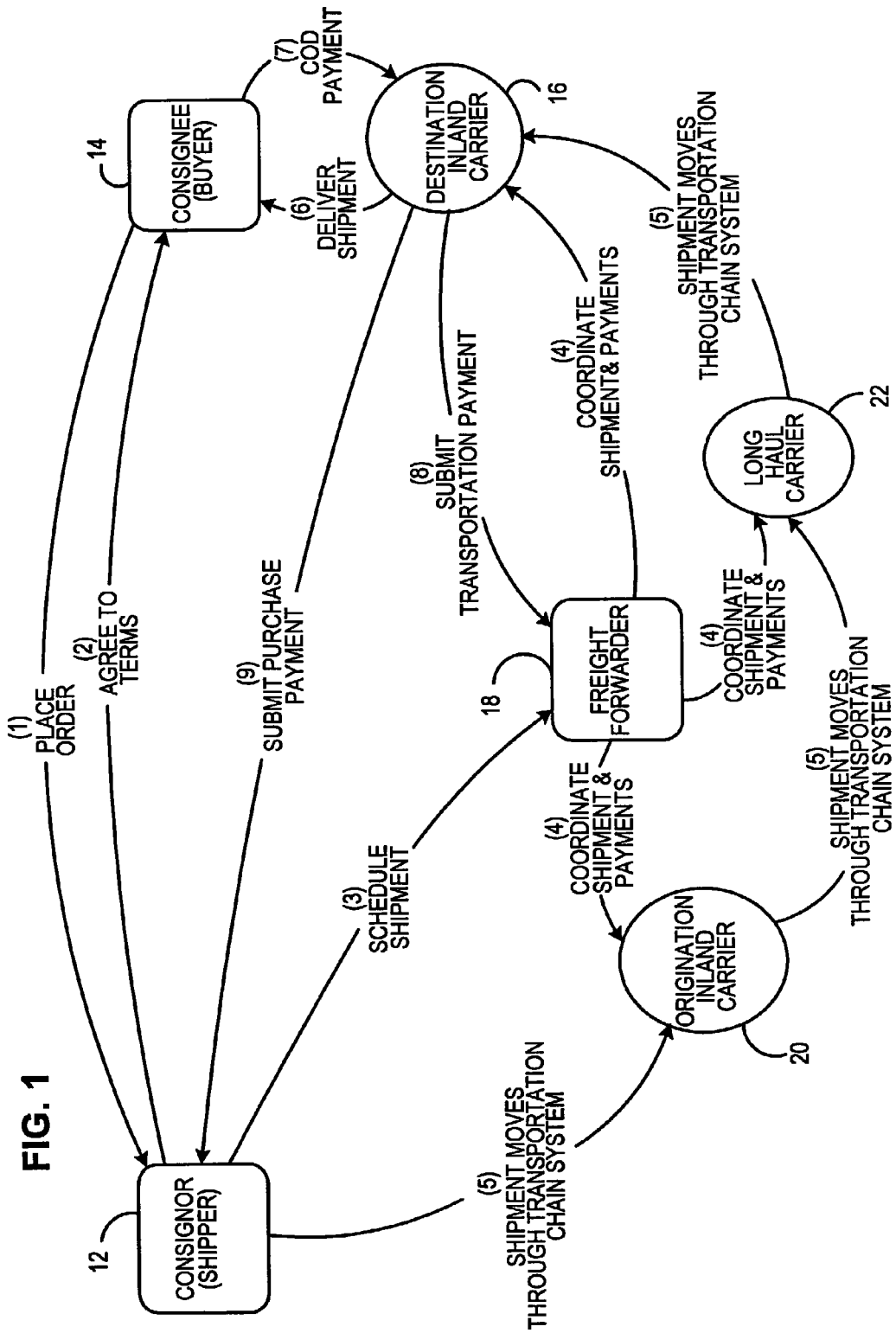
FIG. 1 illustrates portions of a conventional basic C.O.D. transaction process.
Figure 2:
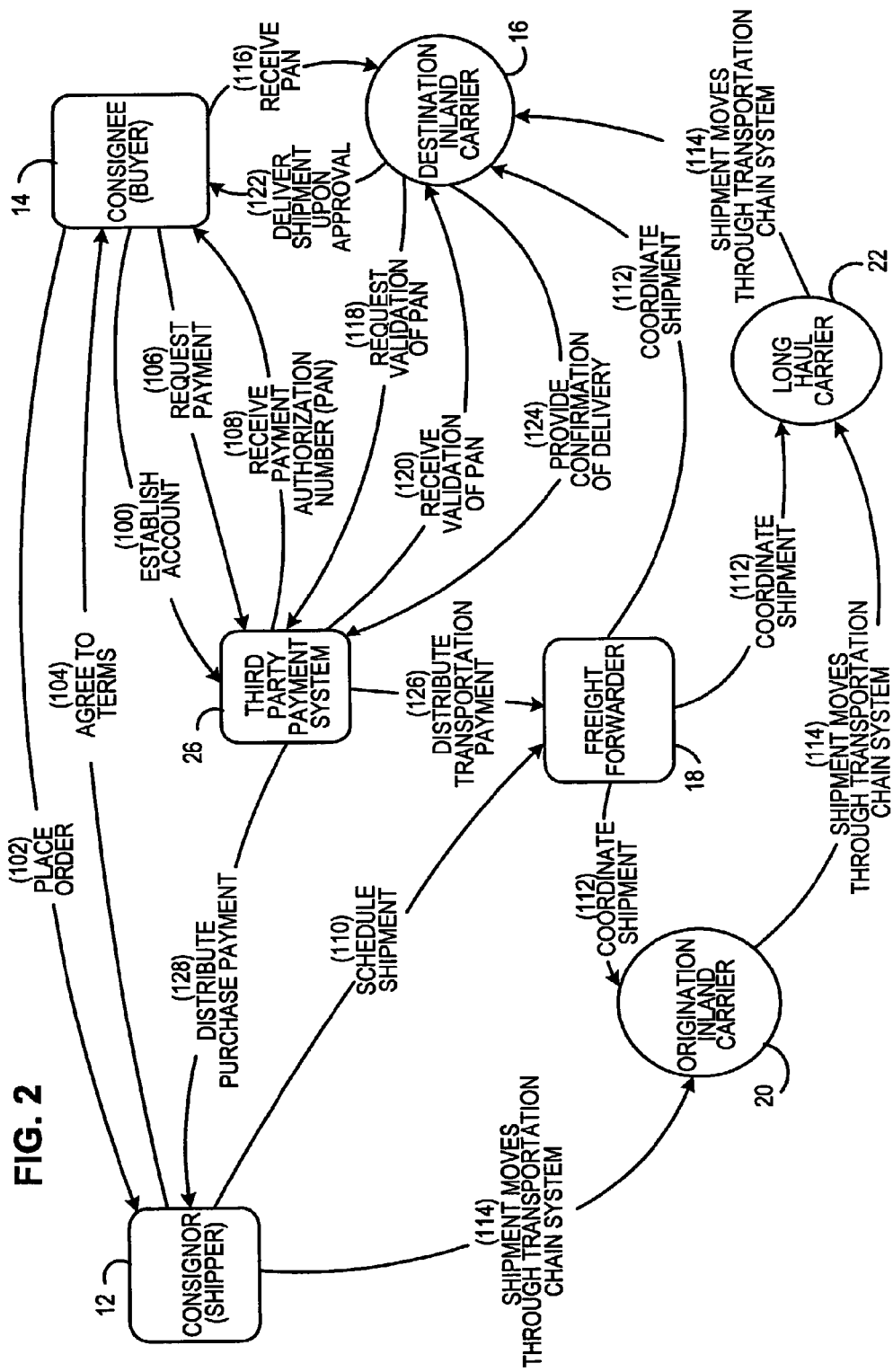
FIG. 2 illustrates portions of a C.O.D. transaction process in accordance with the present invention.

In describing the present invention, reference is made to the drawings, wherein there is seen in FIG. 2 an example of a C.O.D. transaction process between a consignor/seller/shipper 12 (hereinafter referred to as shipper 12) and a consignee/buyer 14 (hereinafter referred to as buyer 14) according to the present invention. While the example illustrated in FIG. 2 illustrates an international shipment, it should be understood that C.O.D. shipments may be both international or national. In addition, it should be understood that while the present invention will be described in the context of a payment system for C.O.D. shipments, the present invention is not so limited and the payment system of the present invention can be utilized in any type of situation in which payments are made from one party to another.

Figure 3:
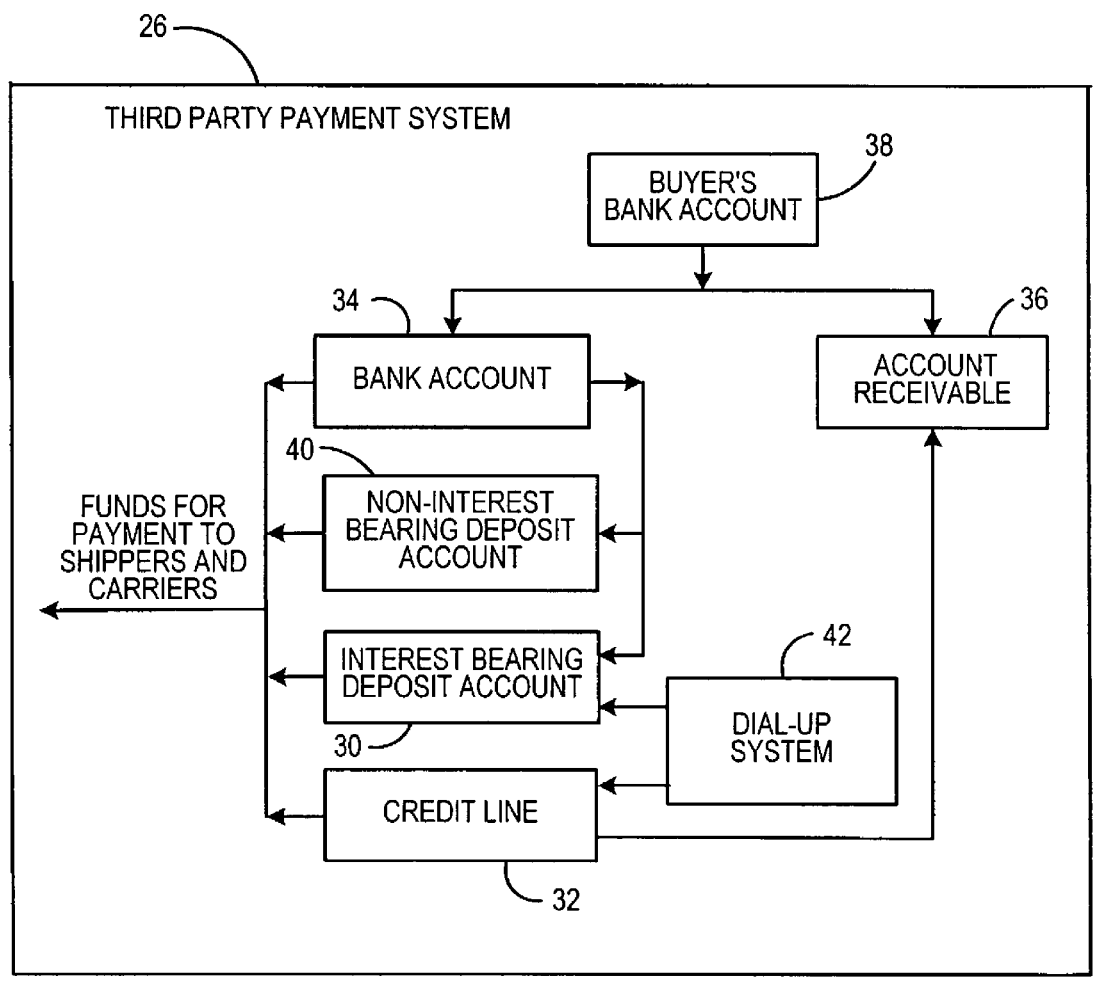
FIG. 3 illustrates in block diagram form an exemplary account for payment on behalf of a buyer maintained by the third party payment system according to the present invention.

In step (100), the buyer 14 establishes an account with a third party payment system 26 to provide services related to receipt by the buyer 14 of C.O.D. shipments. Specifically, the third party payment system 26 is authorized by the buyer 14 to make payments to a shipper 12 (and, if applicable, a freight forwarder 18) on behalf of the buyer 14 upon receipt of goods by the buyer 14 shipped by the seller 12 C.O.D. This account for buyer 14 can be established in a number of different ways as illustrated in FIG. 3. FIG. 3 illustrates in block diagram form an example of an account that can be established within third party payment system for a buyer 14. Referring to FIG. 3, third party payment system 26 can establish an interest bearing deposit account 30 and/or a non-interest bearing deposit account 40 for buyer 14 from which funds may be used to pay the charges associated with receipt by the buyer 14 of goods shipped C.O.D. Interest bearing deposit account 30 allows the buyer 14 to accumulate interest on any funds deposited in interest bearing deposit account 30. Funds for the interest bearing deposit account 30 or non-interest bearing deposit account 40 for buyer 14 can be provided by transferring funds, in any convenient manner, such as, for example, by wire transfer, check, ACH credit, etc., from the buyer's bank account 38 to a bank account 34 of third party payment system 26. These funds are then transferred to the interest bearing deposit account 30 or non-interest bearing deposit account 40. Alternatively to, or in addition to, interest bearing deposit account 30 and/or non-interest bearing deposit account 40, third party payment system 26 could also establish a credit line 32 for buyer 14 if desired. Payments made for shipments received C.O.D. by the buyer 14 are billed to the buyer 14 by the accounts receivable department 36 of third party payment system 26, which then receives payment from the buyer 14, typically from the buyer's bank account 38. Additionally, the interest bearing deposit account 30, non-interest bearing deposit account 40 and/or credit line 32 could be maintained by buyer 14 utilizing a dial-up system 42. Thus, the present invention provides buyer 14 with multiple payment options for reconciling payments made by the third party payment system 26 on behalf of the buyer 14 including "Just-In-Time" payments, "Pay In Advance" payments, and/or "Pay In Arrears" payments. The "Just-In-Time" payment option allows the buyer 14 to pay the third party payment system 26 upon actual receipt of goods by the buyer 14, such as, for example, by an ACH debit. The "Pay In Arrears" payment option provides the buyer 14 with a credit line 32. The "Pay In Advance" payment option may provide buyer 14 with interest on funds previously deposited. All of the payment solutions of the present invention allow the buyer 14 to view all of their account detail on-line via a remote computer coupled to a network, such as, for example, the Internet. Account details include, for example, historical payment information, initiation of on-line payments, and initiation and approval of authorizations on-line.

Referring again to FIG. 2, the buyer 14 places an order for goods with the shipper 12 in step (102), and in step (104) the terms of the sale are agreed to by the buyer 14. Under the C.O.D. payment option, the buyer 14 agrees to make payment simultaneously with the receipt of the shipment. The terms of the sale can indicate that payment is to be made utilizing the third party payment system 26, as requested by either the buyer 14 or the seller 12. Thus, if the seller 12 requests that payment be made via the third party payment system 26 and buyer 14 does not currently have an account with the third party payment system 26, buyer 14 will be required to establish an account or provide funding to third party payment system 26 for such payment.

In step 106 the buyer 14 makes a request for payment to the third party payment system 26 for the charges associated with the terms of sale agreed to in step (104). The request can be made using any suitable communication technique, such as, for example, via telephone, cellular telephone, facsimile, or via a network, such as the Internet. The request may include information related to the purchase of the goods, such as, for example, a manifest of the specific items with descriptions, the name and address of the seller, a range of dates during which the shipment of goods will be delivered, the estimated cost of the shipment (which may or may not include transportation expenses), including a "not to exceed" cost authorized by the buyer 14, and the address at which the shipment is to be delivered. Alternatively, the request may be as simple as an order number generated by the buyer 14, shipper 12 or third party payment system 26. The buyer 14 authorizes the third party payment system 26 to provide the shipper 12 with payment for the goods on behalf of the buyer 14 upon receipt of the goods by the buyer 14. Additionally, if the buyer 14 is responsible for paying any transportation charges and the transportation charges will be billed separately from the purchase price, the buyer 14 can authorize the third party payment system 26 to make payments to the carrier(s) or freight forwarder 18.

In step (108), the information related to the purchase of the goods by the buyer 14 is processed by the third party payment system 26, and a Payment Authorization Number (PAN) is generated by the third party payment system 26 and communicated to the buyer 14. Such communication can be performed, for example, via any suitable communication technique, such as, for example, via telephone, cellular telephone, facsimile, or via a network, such as the Internet. The PAN can be, for example, a randomly or cryptographically generated alphanumeric string or the like that may be linked to the information that identifies the shipment of the goods. If a delivery will consist of multiple shipments, third party payment system 26 may issue multiple PANs, one for each shipment in the delivery. Alternatively, if a delivery will consist of multiple shipments, third party payment system 26 can issue a single PAN to cover all of the shipments within the delivery.

According to another embodiment of the present invention, instead of generating a PAN, the information related to the shipment is simply stored by third party payment system 26, such as, for example, in a database (not shown), and associated with the buyer 14 for future accessing as will be described below.

Once a freight forwarder 18 has been determined, then in step (110) the shipper 12 contacts the freight forwarder 18 to arrange for the shipment of the goods to the buyer 14. In step (112) the freight forwarder 18 coordinates the shipment with various participants, typically one or more carriers. The participants include, for example, an origination inland carrier 20, a long haul carrier 22, such as, for example, an air cargo carrier for international shipments, and a destination inland carrier 16. Thus, the freight forwarder 18 will schedule with the origination inland carrier 20 the physical pick-up of the shipment and associated documentation (bill of lading, commercial invoice, etc.) from the shipper 12, delivery to long haul carrier 22, and subsequent delivery to the destination inland carrier 16. Of course, the shipment could also be palletized for consolidation with other shipments before being delivered to the origination inland carrier 20 or long haul carrier 22. In step (114), which of course may be concurrent with step (112), the shipment moves through the transportation chain system.

Upon arrival of the shipment and customs clearance in the destination country (for international shipments), the shipment is made available for pick-up by the destination inland carrier 16 for delivery to the buyer 14. Of course, if the shipment was palletized, it must first be broken down into the individual shipments for final delivery. In step (116), the destination inland carrier 16 physically brings the shipment to the buyer 14, along with the shipper's 12 C.O.D. purchase invoice, and, since transportation expenses are being paid by the buyer 14 and are being billed separately from the purchase price in this example, the C.O.D. transportation invoice(s). Also in step (116), the buyer 14 provides the PAN generated by the third party payment system 26 to the destination inland carrier 16.

In step (118), the destination inland carrier 16 communicates with the third party payment system 26 to request validation of the PAN received from the buyer 14. Such communication can be performed, for example, via telephone, cellular telephone or a network, such as, for example, the Internet. Preferably, the communication can be performed by the destination inland carrier 16 utilizing a field operable device that does not require a physical connection to a stationary power source or network. The third party payment system 26, upon receipt of the PAN from the destination inland carrier, will then determine if the PAN is valid, i.e., a previously issued PAN, and if it is, confirm validity of the PAN to the destination inland carrier 16 in step (120). Optionally, along with a validation of the PAN, the third party payment system 26 may provide the destination inland carrier 16 with additional verification information related to the shipment, such as, for example, a description of the goods being delivered, the name and address of the buyer and/or shipper, the actual location delivery is to take place, and the origination address of the shipment.

Alternatively, if a PAN is not generated by the third party payment system 26, the destination inland carrier 16 can communicate with the third party payment system 26 and provide certain information specific to the shipment, such as, for example, the name and address of the buyer 14, one or more of a manifest of the specific items with descriptions, the name and address of the shipper 12, the date of delivery, the cost of the shipment, and the address at which the shipment is being delivered. Third party payment system 26 can then compare the information specific to the shipment as provided by the destination inland carrier 16 with all stored information relating to expected shipments associated with the buyer 14. The third party payment system 26 will determine if the shipment for delivery by the destination inland carrier 16 meets the criteria of any of the shipments for which payment has been previously authorized by buyer 14. The criteria includes, for example, a manifest of the specific items with descriptions, the name and address of the seller, a range of dates during which the shipment of goods will be delivered, the estimated cost of the shipment, including a "not to exceed" cost authorized by the buyer 14, and the address at which the shipment is to be delivered. If third party payment system 26 determines the shipment for delivery by the destination inland carrier 16 meets the criteria for a shipment for which payment has been previously authorized by buyer 14, then third party payment system 26 will provide authorization to destination inland carrier 16 to deliver the shipment to the buyer in step (120).

If authorization is not provided to the destination inland carrier 16 to deliver the shipment to buyer 14 because it does not meet one or more of the criteria for an authorized shipment, then according to the present invention buyer 14 can revise the criteria, such as, for example, the "not to exceed price" or otherwise fix the problem that caused rejection of authorization of the shipment.

Upon receipt of the validation or authorization in step (120), the destination inland carrier 16 will then physically deliver the shipment to the buyer 14 in step (122). The destination inland carrier 16 can then provide confirmation to the third party payment system 26 in step (124) that the shipment has been delivered to the buyer 14. It should be noted that such confirmation need not be provided simultaneously with delivery of the shipment. For example, confirmations of delivery could be performed at predetermined time intervals, such as, for example, once or twice a day.

Upon receipt of confirmation of delivery of the shipment to the buyer 14, the third party payment system 26 can provide payment for the shipment. For example, in step (126), the third party payment system 26 can arrange for payment to be made to the freight forwarder 18. In addition, in step (128), which may be concurrent with or before step (126), third party payment system 26 can arrange for payment to the shipper 12. Of course, if the transportation expenses were included in the purchase price, then third party payment system 26 will not provide any payment to the freight forwarder 18 and instead provide only a single payment to the shipper 12 for distribution as applicable. Preferably, such payments to the freight forwarder 18 and shipper 12 are made electronically. Typically, the payment is required to be received by the freight forwarder 18 and shipper 12 within a predetermined number of days, such as, for example, thirty days from delivery. Third party payment system 26 could arrange with one or both of the freight forwarder 18 and shipper 12 to make the full payment on the date it is due, or alternatively to make a discounted payment earlier than the due date. In this manner, the shipper 12 and/or freight forwarder 18 will not receive the full amount, as the difference will be retained by the third party payment system 26, but will receive payment much sooner (possibly even on the day of delivery), thereby reducing their overall costs.

It should be noted, of course, that the freight forwarder 18, origination inland carrier 20, long haul carrier 22 and destination inland carrier 16 may not be separate entities, but instead all of them or any combination could be the same entity. Additionally, it should be noted that while the example illustrated in FIG. 2 utilizes a long haul carrier 22, shipments can also be made utilizing only a single inland carrier. In many situations, especially for domestic shipments, the origination inland carrier 20, freight forwarder 18 and destination inland carrier 16 will be the same entity. Furthermore, it should be noted that the third party payment system 26 and the freight forwarder 18 may also be the same entity.

Thus, the present invention provides a trusted closed loop payment system and method that reduces the liability imposed upon carriers for delivery of C.O.D. shipments. A third party payment system is authorized by the buyer to make payments to a shipper (and, if applicable, a freight forwarder) on behalf of the buyer upon receipt of goods by the buyer. Since the payment for the shipment is being made by the third party payment system, and guaranteed by the third party payment system, the liability imposed on the carrier to ensure the payment is proper and will be honored is removed. In addition, the present invention provides several advantages for shippers and buyers as well, including receipt of payment by a shipper in a much shorter time frame, and multiple payment options for buyers for account reconciliation with the third party payment system for the C.O.D. shipments.

Those skilled in the art will also recognize that various modifications can be made without departing from the spirit of the present invention. For example, the PAN generated by the third party payment system 26 (step (108) of FIG. 2) could be given to both the buyer 14 and the destination inland carrier 16. When the destination inland carrier 16 physically brings the shipment to the buyer 14 (step (116) of FIG. 2), the buyer 14 must provide the destination inland carrier 16 with the matching PAN. If the buyer 14 provides the destination inland carrier with the matching PAN, the destination inland carrier 16 will then deliver the shipment to the buyer 14 and inform the third party payment system of receipt of the matching authorization number. Based upon the receipt from the destination inland carrier 16 that the matching PAN was provided by the buyer 14, the third party payment system 26 will provide for payment of the shipment to the shipper 12 and/or freight forwarder 18. Utilizing this scenario, the destination inland carrier 16 does not need to request validation of the PAN from the third party payment system 26 (step (118) of FIG. 2).

As another example, the above scenario could be expanded to provide additional security. For example, the third party payment system 26 could provide each of the buyer 14 and the destination inland carrier 16 with a complimentary cryptographic key instead of the PAN. The third party payment system 26 will also provide an encrypted authorization message to either one or both of the buyer 14 and destination inland carrier 16 via any suitable communication technique as described above. The message could be, for example, as simple as "Authorization Approved" or "Delivery Authorized." The encrypted message requires both keys to decrypt. When the destination inland carrier 16 physically brings the shipment to the buyer 14 (step (116) of FIG. 2), the buyer 14 provides the destination inland carrier 16 with its complimentary key, and the destination inland carrier 16 will attempt to decrypt the message using the key provided by the buyer 14 and the complimentary key received from the third party payment system 26. This could be done, for example, by the destination inland carrier 16 entering the keys and encrypted message into a field operable processing device that would utilize the keys to decrypt the message. If the keys are the complimentary keys issued by the third party payment system 26, the message will be properly decrypted and provided to the destination inland carrier 16. Thus, upon receipt of the message, such as, for example, "Authorization Approved" or "Delivery Authorized," the destination inland carrier 16 will then deliver the shipment to the buyer 14 and confirm decryption of the encrypted authorization message and/or delivery of the shipment to the third party payment system 26. Based upon the confirmation of decryption and/or delivery from the destination inland carrier 16, the third party payment system 26 will provide for payment of the shipment to the shipper 12 and/or freight forwarder 18.

Alternatively, instead of or in addition to encrypting the message, the message could optionally be signed by the third party payment system 26, utilizing a signature key, and provided to either the buyer 14 or destination inland carrier 16. The party not receiving the signed message would be provided with the key that can be utilized to verify the signature. When the destination inland carrier 16 physically brings the shipment to the buyer 14 (step (116) of FIG. 2), the buyer 14 provides the destination inland carrier 16 with either the key or signed message, as applicable, and the destination inland carrier 16 will attempt to verify the signature of the message. This could be done, for example, utilizing a field operable processing device. If the signature is verified, the destination inland carrier 16 will then deliver the shipment to the buyer 14.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is defined by the appended claims and their equivalents.

What is claimed is:

1. A method for a carrier to deliver goods to a buyer from a shipper comprising:

receiving an encrypted authorization message, the encrypted authorization message being previously generated by a payment system and being associated with the goods being delivered and requiring a first cryptographic key and a corresponding second cryptographic key to decrypt;

receiving the first cryptographic key;

receiving the second cryptographic key from the buyer;

inputting the encrypted authorization message, the first cryptographic key and the second cryptographic key into a field operable processing device;

operating the field operable processing device to decrypt the encrypted authorization message using the first cryptographic key and the second cryptographic key; and upon successful decryption of the encrypted authorization message by the field operable processing device, delivering the goods to the buyer and providing confirmation of the delivery of the goods to the payment system, wherein payment for the goods will be made by the payment system to the shipper on behalf of the buyer.

2. The method according to claim 1, wherein the encrypted authorization message is received from the buyer.

3. The method according to claim 1, wherein the first cryptographic key is received from the payment system.

4. The method according to claim 1, wherein the encrypted authorization message is provided with a verification signature, the method further comprising:

verifying the signature of the encrypted authorization message.

* * * * *